(12) United States Patent
Wan et al.

(10) Patent No.: US 9,202,493 B1
(45) Date of Patent: Dec. 1, 2015

(54) METHOD OF MAKING AN ULTRA-SHARP TIP MODE CONVERTER FOR A HAMR HEAD

(71) Applicant: Western Digital (Fremont), LLC, Fremont, CA (US)

(72) Inventors: Dujiang Wan, Fremont, CA (US); Ge Yi, San Ramon, CA (US); Lijie Zhao, Pleasanton, CA (US); Zhong Shi, Dublin, CA (US); Hai Sun, Milpitas, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 20 days.

(21) Appl. No.: 14/287,467

(22) Filed: May 27, 2014

Related U.S. Application Data

(60) Provisional application No. 61/946,483, filed on Feb. 28, 2014.

(51) Int. Cl.
| | |
|---|---|
| *G11B 11/00* | (2006.01) |
| *B29D 11/00* | (2006.01) |
| *G11B 5/127* | (2006.01) |
| *G11B 5/48* | (2006.01) |
| *G11B 5/00* | (2006.01) |

(52) U.S. Cl.
CPC ............ *G11B 5/4866* (2013.01); *G11B 5/4806* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |

(Continued)

*Primary Examiner* — Thang Tran

(57) ABSTRACT

A mode converter for use in a Heat-assisted magnetic recording (HAMR) read head to couple or bend light (e.g., from an external laser diode) into a tapered waveguide, and subsequently, to a near field transducer is provided. The mode converter may have an ultra-sharp tip, e.g., less than 200 nm to achieve a desired optical output. Manufacturing such a mode converter involves a two-pattern transform process, where overlay control (using a first edge, such as a right edge, as a reference layer relative to which positioning of a second edge, such as a left edge, is measured) allows for aligning of the right and left edges of a tip portion of the mode converter to ultimately create the ultra-sharp tip.

15 Claims, 12 Drawing Sheets

(56) References Cited

U.S. PATENT DOCUMENTS

| | | |
|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,411,764 B1 | 6/2002 | Lee |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,519,077 B1 | 2/2003 | Mizuuchi et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,639,735 B2 | 10/2003 | Park et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |

(56) References Cited

U.S. PATENT DOCUMENTS

| | | |
|---|---|---|
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |

(56) References Cited

U.S. PATENT DOCUMENTS

| | | | |
|---|---|---|---|
| 7,583,466 B2 | 9/2009 | Kermiche et al. |
| 7,595,967 B1 | 9/2009 | Moon et al. |
| 7,599,585 B2 | 10/2009 | Blauvelt et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1* | 1/2013 | Gao et al. .................. 216/22 |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1* | 2/2013 | Hu et al. .................. 369/13.01 |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |

(56) References Cited

U.S. PATENT DOCUMENTS

| | | |
|---|---|---|
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,773,956 B1* | 7/2014 | Wang et al. ............... 369/13.01 |
| 8,780,498 B1 | 7/2014 | Jiang et al. |
| 8,780,505 B1 | 7/2014 | Xiao |
| 8,786,983 B1 | 7/2014 | Liu et al. |
| 8,787,129 B1* | 7/2014 | Jin et al. ................... 369/13.33 |
| 8,790,524 B1 | 7/2014 | Luo et al. |
| 8,790,527 B1* | 7/2014 | Luo et al. ........................ 216/24 |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2004/0057667 A1* | 3/2004 | Yamada et al. ................ 385/43 |
| 2004/0114869 A1 | 6/2004 | Fike et al. |
| 2005/0183946 A1 | 8/2005 | Pan et al. |
| 2005/0213912 A1* | 9/2005 | Aalto ............................. 385/129 |
| 2006/0037364 A1* | 2/2006 | Chang et al. .................... 65/386 |
| 2008/0310808 A1* | 12/2008 | Fried et al. .................... 385/129 |
| 2010/0290157 A1 | 11/2010 | Zhang et al. |
| 2011/0086240 A1 | 4/2011 | Xiang et al. |
| 2011/0090588 A1* | 4/2011 | Gao et al. ......................... 360/59 |
| 2011/0134567 A1* | 6/2011 | Chen et al. ............... 360/123.12 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

METHOD OF MAKING AN ULTRA-SHARP TIP MODE CONVERTER FOR A HAMR HEAD

CROSS-REFERENCE TO RELATED APPLICATIONS

This application claims the benefit of U.S. Provisional Application Ser. No. 61/946,483, filed Feb. 28, 2014, which is incorporated herein by reference in its entirety.

BACKGROUND

For all types of substrates, magnetic recording media has begun to incorporate perpendicular magnetic recording (PMR) technology in an effort to increase magnetic recording areal density. Although magnetic recording areal densities of approximately 1 Tb/in$^2$ have been achieved, further increases are unlikely as the physical limits of PMR have nearly been met due to the superparamagnetic effect. Accordingly, Heat-assisted magnetic recording (HAMR) technology has been developed to meet the growing demand for improved magnetic disk drive data capacity.

HAMR media is often made of magnetic materials or compounds with a substantially higher magnetocrystalline anisotropy than that of non-HAMR media. Because HAMR media is made of higher-stability magnetic compounds, HAMR media relies upon the application of heat to achieve changes in magnetic orientation. That is, HAMR media is temporarily heated to reduce its coercivity below that of an applied magnetic write field from a recording head. These materials can store bits in a much smaller area without being limited by the superparamagnetic effect. In this regard, HAMR technology is a promising solution for pushing the magnetic recording areal density of a hard disk to beyond 1 Tbit/in$^2$.

BRIEF DESCRIPTION OF THE DRAWINGS

Various embodiments are illustrated by way of example, and not limitation, in the figures of the accompanying drawings in which.

DETAILED DESCRIPTION

In a modern magnetic hard disk drive device, each read/write head is a sub-component of a head gimbal assembly (HGA). The read/write head typically includes a slider and a read/write transducer. The read/write transducer typically comprises a magneto-resistive read element (e.g., a so-called giant magneto-resistive read element, or a tunneling magneto-resistive read element) and an inductive write structure comprising a flat coil deposited by photolithography and a yoke structure having pole tips that face a disk media.

In a HAMR head, delivering laser light from a source onto a HAMR media surface through a tapered wave guide (TWG) and a near field transducer (NFT) becomes critical. The NFT allows for the transfer of enough energy to a small region, thereby heating that small region to a temperature, e.g., close to the Curie temperature of the HAMR media, temporarily so as to achieve writability within a short duration. The scalability of the magnetic recording areal density is determined by that of the NFT, and the writability of a recording layer of the HAMR media (with a high coercivity material as previously alluded to) depends on NFT delivery efficiency.

A mode converter (MC) may be used to couple/bend light (e.g., from an external laser diode) into the TWG, and subsequently, to the NFT, where tip width of the MC is also critical for achieving proper/desired optical output. Accordingly, various embodiments are directed to systems and methods for making an ultra-sharp tip MC that can be utilized in a HAMR head to efficiently collect light from a light source and pass it on to the TWG.

Figure 1:
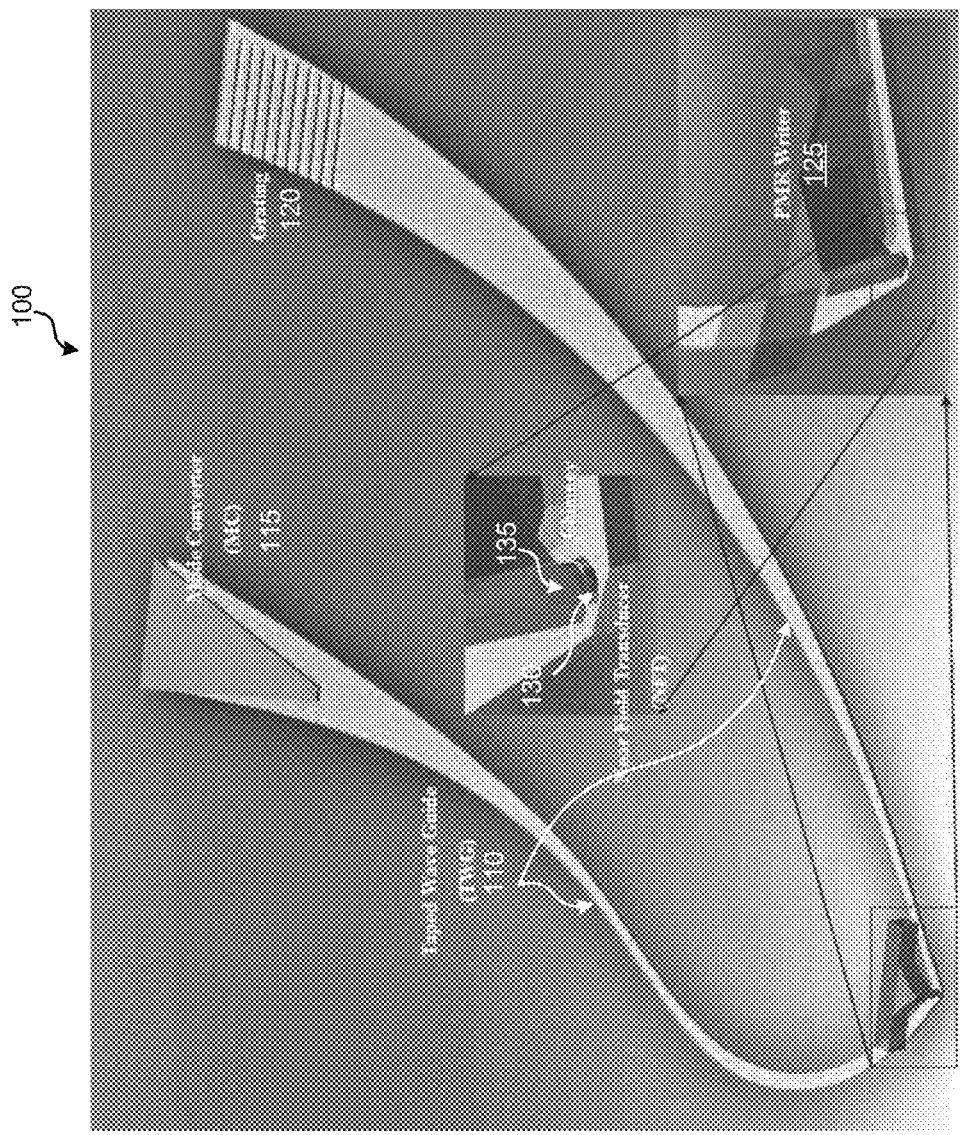
FIG. 1 is a block diagram depicting an example HAMR head.

FIG. 1 is a diagram depicting an example HAMR head 100. It should be noted that only some components of HAMR head 100 are illustrated and discussed herein, while other components commonly known in the art are omitted for clarity. Utilizing HAMR head 100, light energy generated by a light source, e.g., an external laser diode (not shown), is coupled to TWG 110 via MC 115 located on top of an input area of the tapering region of TWG 110. Grating 120, located on top of an output area of the tapering region of TWG 110 may be utilized to monitor the operation of the external laser diode by monitoring the output of TWG 110. TWG 110 guides and directs the light energy to PMR writer/write pole 125 and a recording medium (not shown). PMR writer 125 can include, at least in part, NFT 130, which may be formed on TWG 110 (e.g., a waveguide core) and chimney 135, which can act as a heatsink and which can be formed on a surface of NFT 130. NFT 130 focuses the light energy received from the TWG 110 into a nano-sized light beam and delivers the beam to the recording media so as to heat up a specific recording region thereof.

Figure 2:
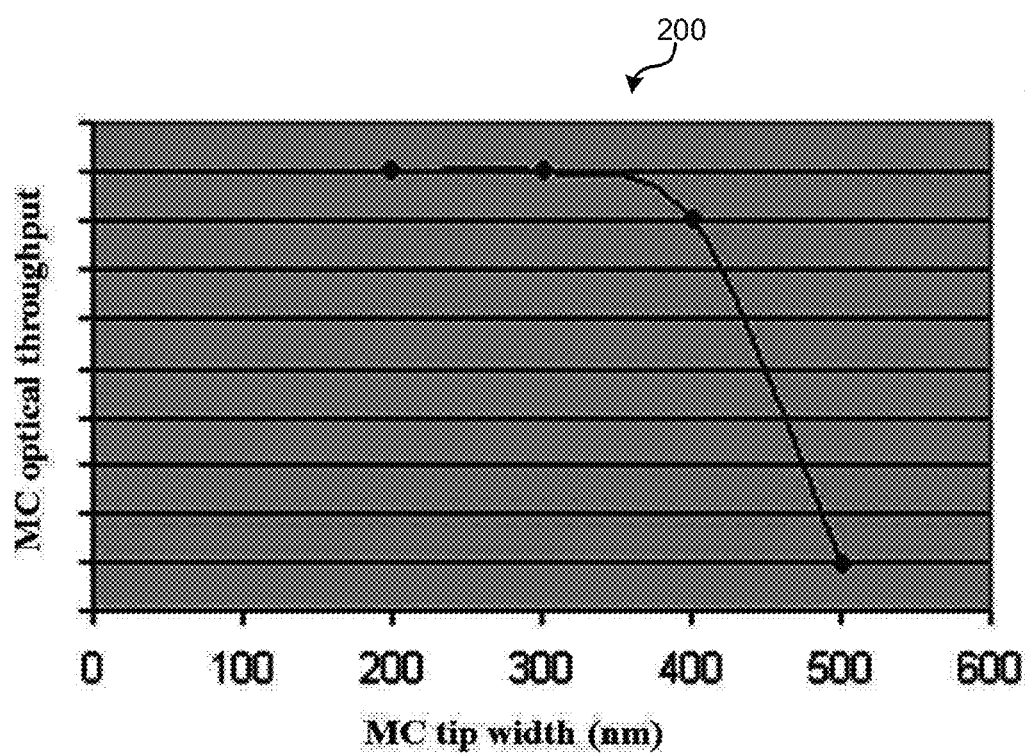
FIG. 2 is a graph illustrating mode converter (MC) output as a function of MC tip width.

As mentioned above, the tip width of an MC, e.g., MC 115, is critical for light coupling efficiency. FIG. 2 is a graph 200 that illustrates MC optical throughput as a function of MC tip width in nanometers (nm). It can be appreciated that after MC tip width increases beyond approximately 300 nm wide, optical throughput via an MC begins to drop dramatically. It should be noted that MC tip widths contemplated in accordance with various embodiments are preferably in the 200 nm (approximately) or sub-200 nm width range, although the methods described herein can be utilized to form an MC having an MC tip of varying/alternative widths. Again, an MC with an ultra-sharp tip would be advantageous in the HAMR context.

Conventionally, critical layers of a read/write head are processed using, e.g., a single-pattern process, where the critical layers are aligned to the read element. However, such a process is insufficient to produce an MC capable of preferred/optimal performance in a HAMR context. Accordingly, various embodiments are directed to systems and methods of manufacturing an ultra-sharp tip MC utilizing a two-pattern transform process, where overlay control (using a first edge, such as a right edge as a reference layer relative to which positioning of a second edge, such as a left edge, is measured) allows for aligning of the right and left edges of a tip portion of the MC to ultimately create the ultra-sharp tip MC.

Figure 3:
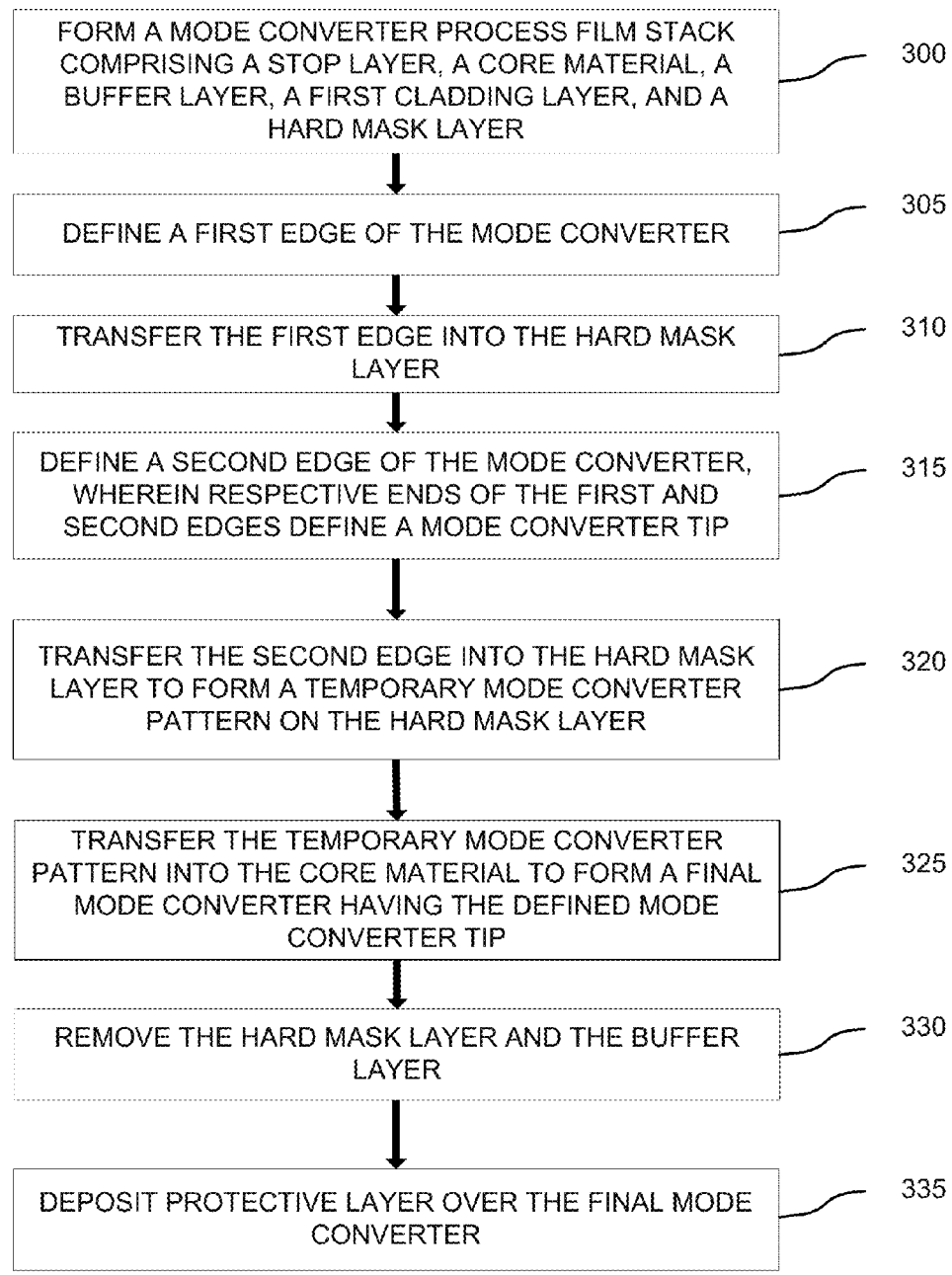
FIG. 3 is a flow chart illustrating example processes performed to manufacture a mode converter having an ultra-sharp tip in accordance with various embodiments.

FIG. 3 is a flow chart illustrating example processes performed in accordance with various embodiments to manufacture an ultra-sharp tip MC. FIGS. 4A-11B illustrate respective cross-sectional and top views of various stages of an MF process film stack during the ultra-sharp tip MC manufacturing process described in connection with the flow chart of FIG. 3.

At operation 300, an MC process film stack is formed. The MC process film stack may include a stop layer, a core material, a buffer layer, a hard mask layer, and a first cladding layer. In accordance with various embodiments, the MC process film stack may be formed by depositing a thin layer of Aluminum Oxide (AlOx) as an MC reactive ion etch (RIE) stop layer. In accordance with one embodiment, this thin layer of AlOx may be approximately 2-3 nm. This can be followed by depositing a layer of Tantalum Pentoxide ($Ta_2O_5$), the core material, on the AlOx MC RIE stop layer, and subsequently depositing a layer of thin Silicon Dioxide ($SiO_2$) as the buffer layer. In one embodiment, the $Ta_2O_5$ layer may be approximately 100-150 nm. The hard mask layer may be deposited on the $SiO_2$ buffer layer. It should be noted that although some embodiments described herein describe utilizing material layers having a certain thickness, other materials and/or thickness are contemplated in accordance with desired performance characteristics of a resulting MC/TWG.

In accordance with one embodiment, the hard mask layer can be a Chromium (Cr) hard mask layer. It should be noted that the hard mask layer can also be Ruthenium (R) or other metallic hard mask layer. The Cr hard mask layer can be deposited on the ($SiO_2$) buffer layer using a bi-layer lift-off process, which subsequent to a dry etching process results in an open metal seed window. That is, and whereas conventionally, metal would be deposited, in accordance with various embodiments a lift-off photoresist "mold" is formed to provide an open target layer with no metal on which metal material may subsequently be deposited. Therefore, in contrast to conventional systems and methods, where, e.g., an ion milling process, would normally be performed to produce an open metal seed window, ion milling need not be performed in the process of creating an MC in accordance with various embodiments. The MC process film stack may further include another $SiO_2$ layer, which as will be described further below, may act as a (first) cladding layer for TWG 110.

Figure 4A:
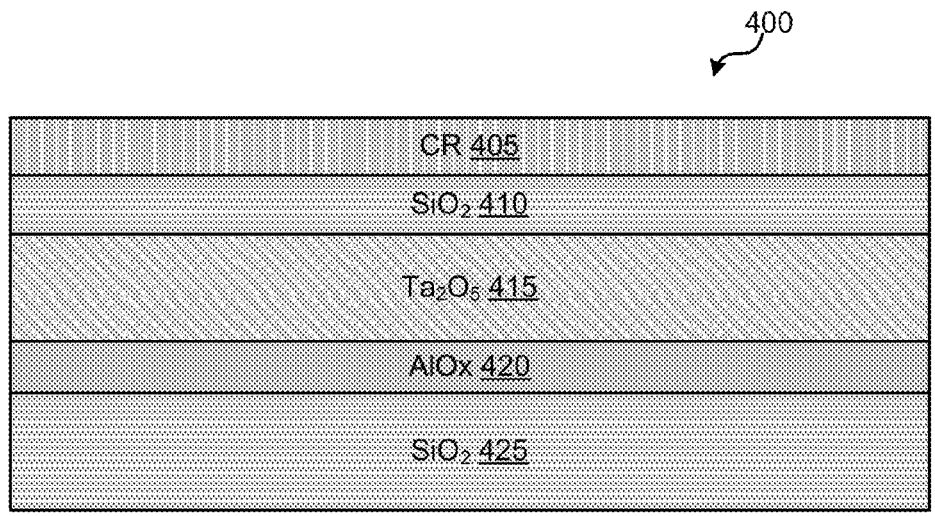
FIGS. 4A and 4B are respective cross-sectional and top views of a wafer film stack used for manufacturing a mode converter having an ultra-sharp tip in accordance with various embodiments.
Figure 4B:
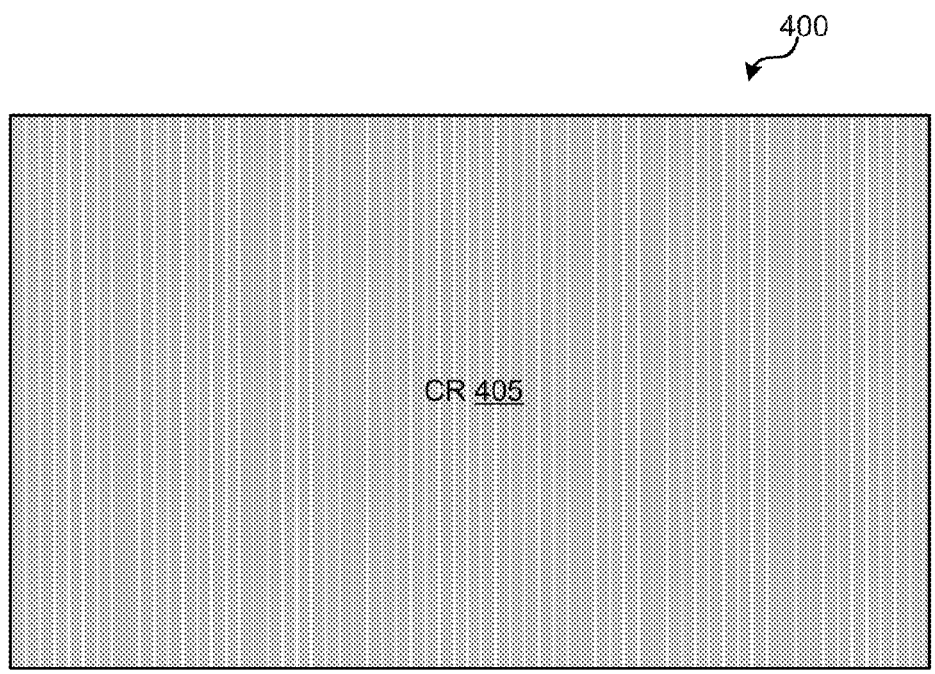
Figure 5A:
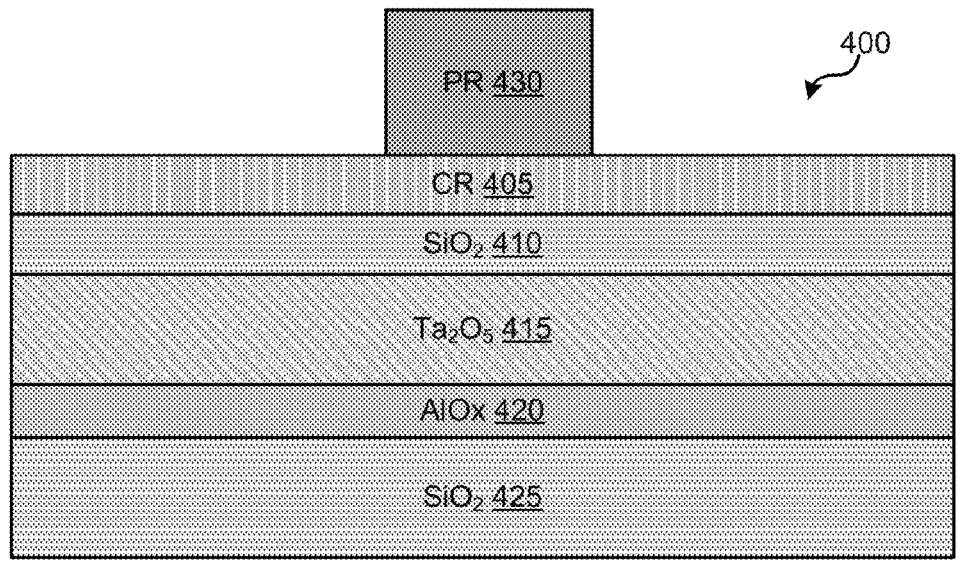
FIGS. 5A and 5B are respective cross-sectional and top views of the wafer film stack of FIGS. 4A and 4B upon which a first mode converter edge has been defined.
Figure 5B:
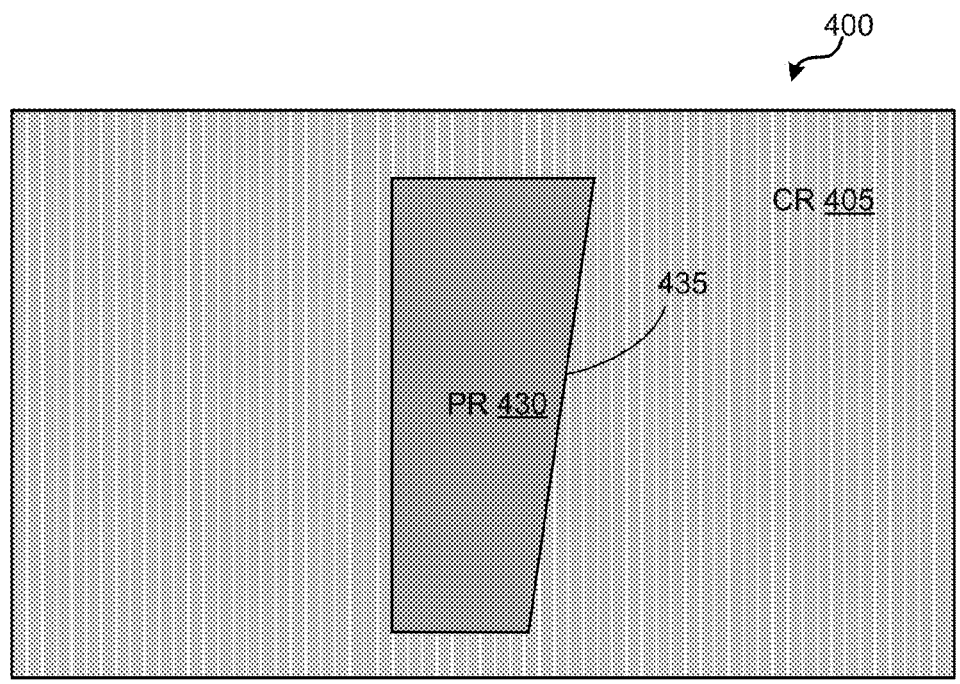
Figure 6A:
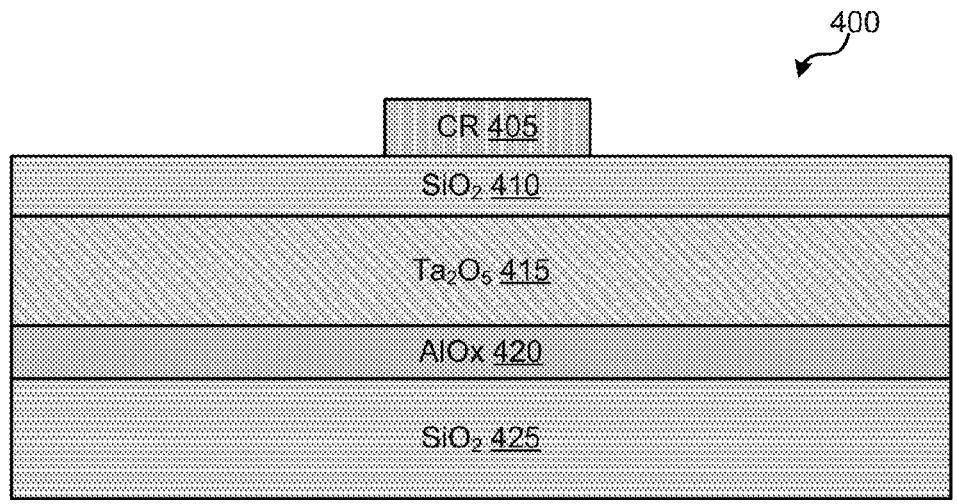
FIGS. 6A and 6B are respective cross-sectional and top views of the wafer film stack of FIGS. 4A and 4B, where the first mode converter edge has been transferred to a hard mask layer.
Figure 6B:
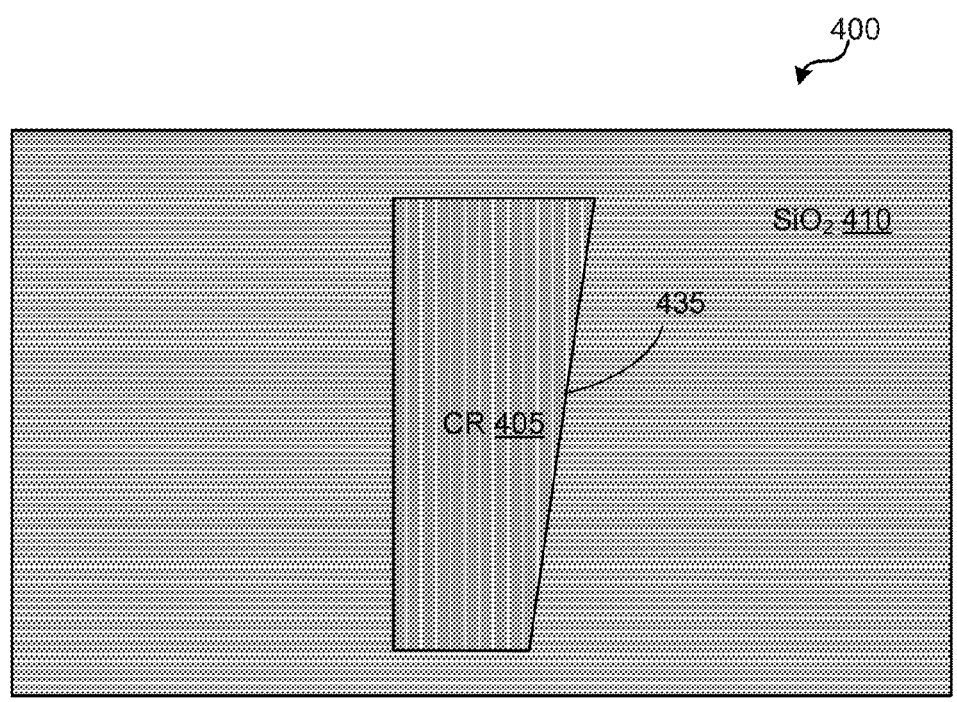
Figure 7A:
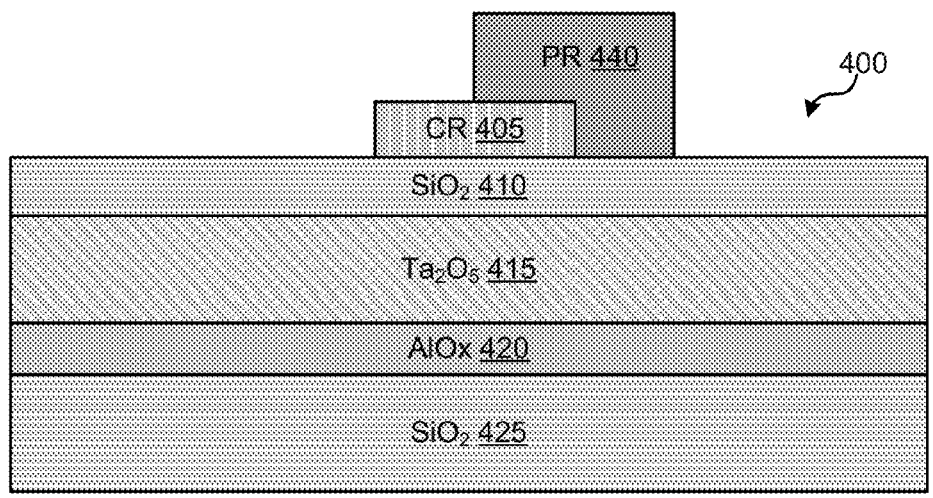
FIGS. 7A and 7B are respective cross-sectional and top views of the wafer film stack of FIGS. 4A and 4B, where a second mode converter edge has been defined.
Figure 7B:
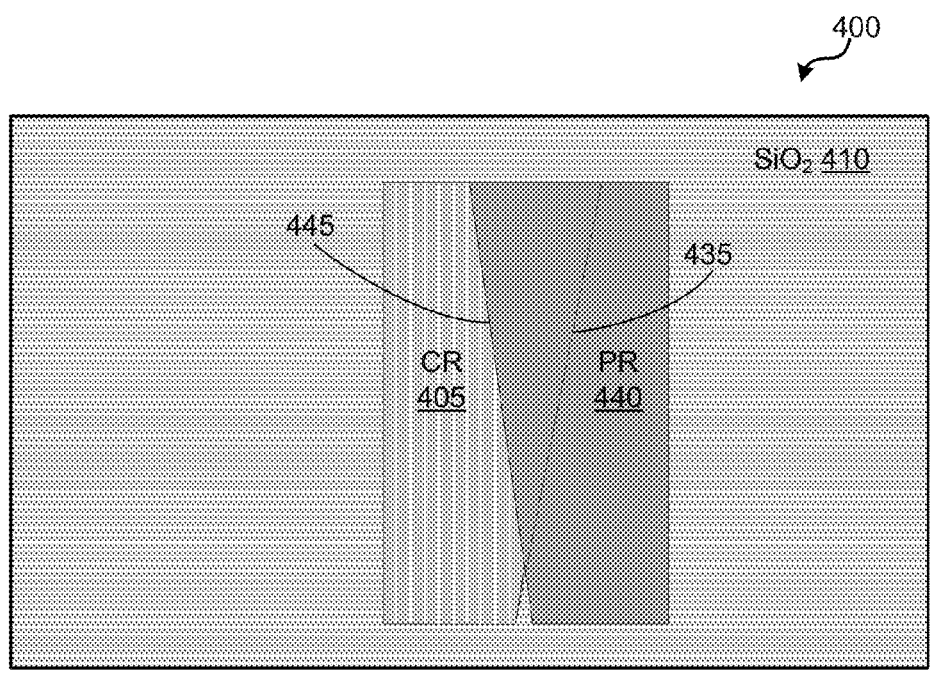
Figure 8A:
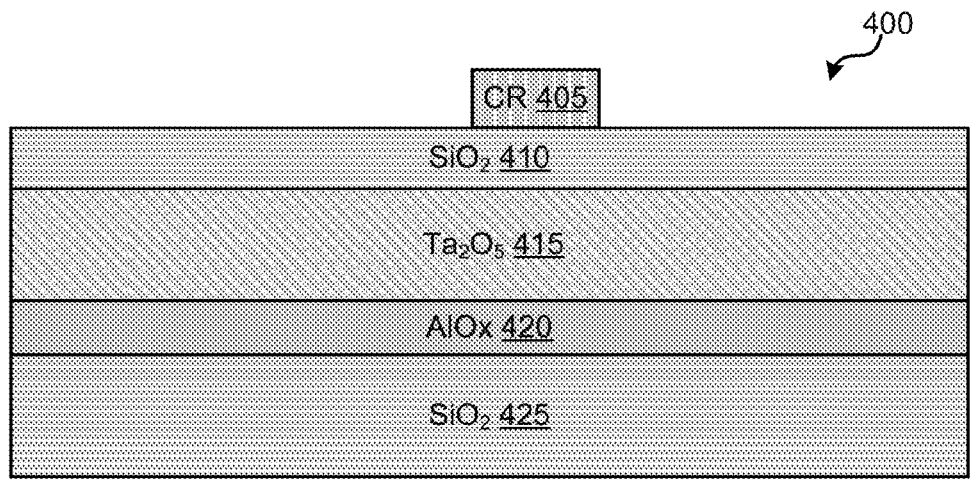
FIGS. 8A and 8B are respective cross-sectional and top views of the wafer film stack of FIGS. 4A and 4B, where the second mode converter edge has been transferred to the hard mask layer.
Figure 8B:
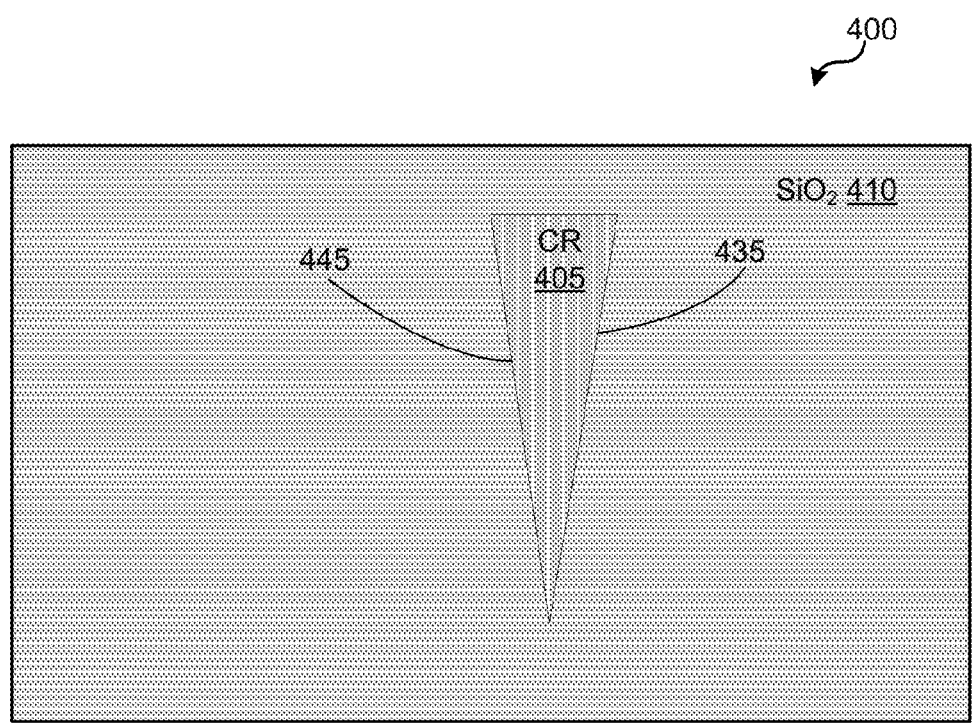
Figure 9A:
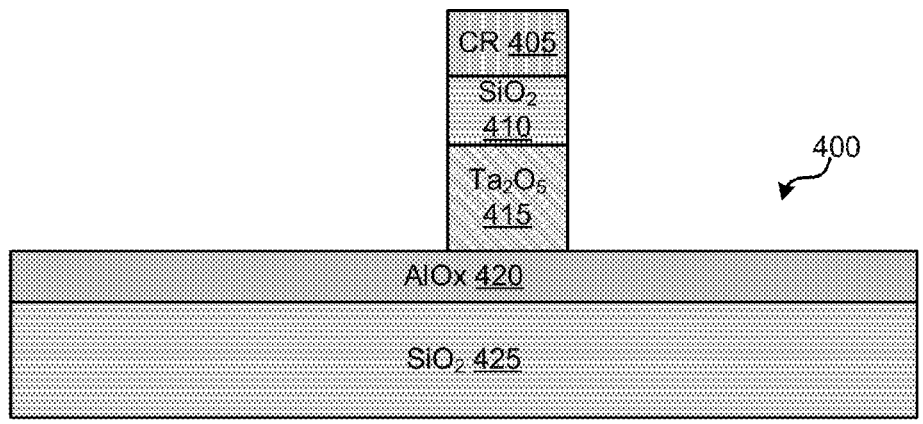
FIGS. 9A and 9B are respective cross-sectional and top views of the wafer film stack of FIGS. 4A and 4B, where a temporary mode converter pattern has been formed on the hard mask layer.
Figure 9B:
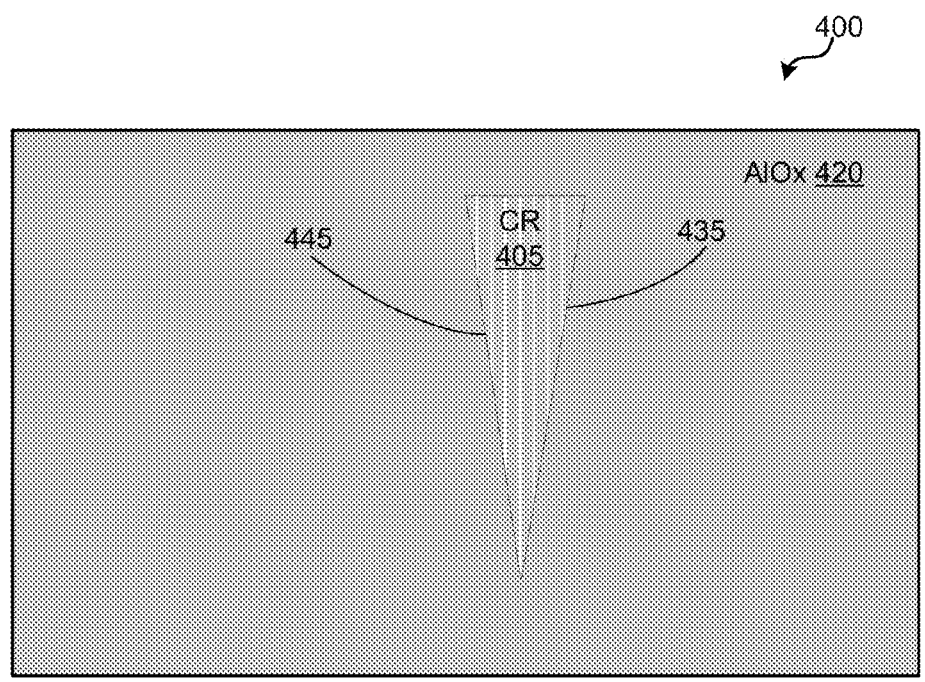
Figure 10A:
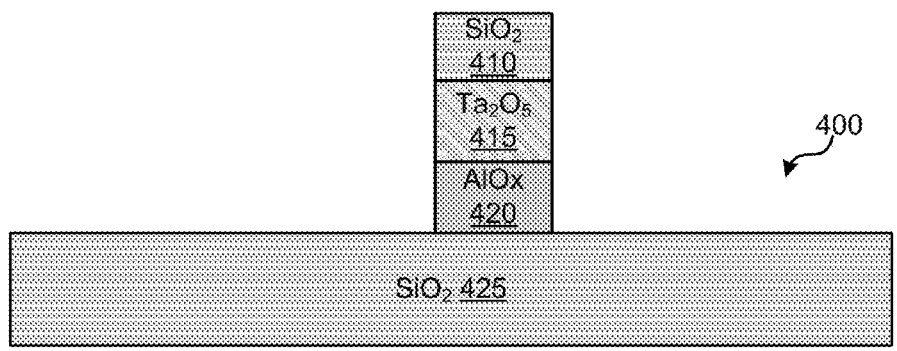
FIGS. 10A and 10B are respective cross-sectional and top views of the wafer film stack of FIGS. 4A and 4B, where the temporary mode converter pattern has been transferred into a core layer.
Figure 10B:
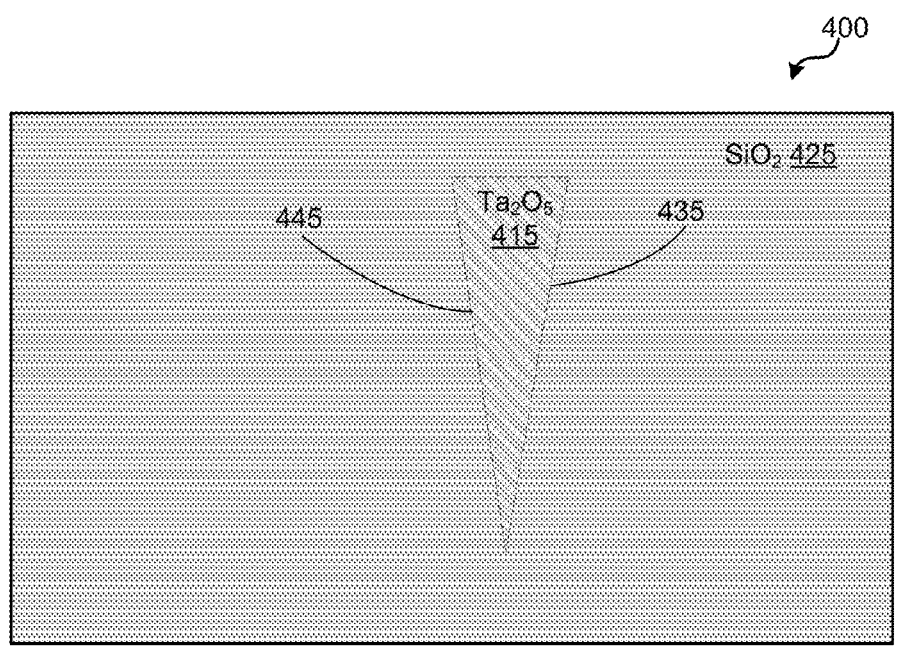

As illustrated in the respective cross-sectional and top view of FIGS. 4A and 4B, the MC process film stack 400 may comprise a plurality of layers, including a Cr hard mask layer 405, a $SiO_2$ buffer layer 410, a $Ta_2O_5$ core material layer 415, an AlOx MC RIE stop layer 420, and a first $SiO_2$ cladding layer 425.

At operation 305, a first edge of the MC is defined. In accordance with various embodiments, the first edge of the mode converter to be defined can be either the right edge or the left edge. As illustrated in the respective cross-sectional and top view of FIGS. 5A and 5B, photoresist material 430 defining the first edge (in this example, the right edge 435) can be applied on the Cr hard mask layer 405 of MC process film stack 400. Using a first deep ultraviolet (DUV) photolithography process, the pattern defined by the photoresist material 430 can be exposed and developed.

At operation 310, the first edge is transferred into the hard mask layer. The transferring of the first edge (in this example, right edge 435) can be accomplished by a first hard mask RIE process utilized on the Cr hard mask layer 405. As illustrated in the respective cross-sectional and top view of FIGS. 6A and 6B, RIE can be used to etch off the unwanted areas of CR hard mask layer 405, leaving the pattern defining right edge 435 in the Cr hard mask layer 405. Additionally, and subsequent to etching of Cr hard mask layer 405, photoresist material 430 may be cleaned/stripped away.

At operation 315, and similar to operation 305, a second edge of the MC is defined (in this example, the left edge 445), wherein respective ends of the first and second edges define an MC tip. As previously discussed, the MC tip in accordance with various embodiments, is an ultra-sharp tip having a width, in accordance with one embodiment, in the 200 nm range, and in another embodiment, in the sub-200 nm range. As illustrated in the respective cross-sectional and top view of FIGS. 7A and 7B, photoresist material 440 defining the second edge (in this example, left edge 445) can be applied to MC process film stack 400. Using a second deep ultraviolet (DUV) photolithography process, the pattern defined by photoresist material 440 can be exposed and developed. In other words, a sequential dual photolithograph process can be utilized to achieve the desired ultra-sharp tip in accordance with various embodiments.

As alluded to above, creating an MC with an ultra-sharp tip having a width of approximately 200 nm or less cannot be achieved or is at best, impractical, utilizing a single-pattern process aligned to the reader element of a read/write head. That is, conventional MC formation processes may utilize a reference layer relative to which first and second edges of an MC tip are measured. In contrast, and in accordance with various embodiments, a separate reference layer need not be utilized. Instead, the first edge may be utilized as a reference layer, and measurements associated with formation of the second edge are made relative to that first edge. Accordingly, various embodiments utilize the two-pattern process described herein where the first and second (e.g., right and left) edges are measured and aligned relative to each other using overlay control with the second DUV photolithography process.

At operation 320, the second edge is transferred into the hard mask layer to form a temporary MC pattern on the hard mask layer. The transferring of the second edge (in this example, left edge 445) can be accomplished by a second hard mask RIE process utilized on the remaining portion of Cr hard mask 405 (in which right edge 435 has been defined). As illustrated in the respective cross-sectional and top view of FIGS. 8A and 8B, RIE can be used to etch off the unwanted areas of the remaining area of CR hard mask layer 405 (defining right edge 435), thus leaving/forming a temporary pattern defining the MC with an ultra-sharp tip in Cr hard mask layer 405. Additionally, and subsequent to etching of the remaining area of Cr hard mask layer 405, photoresist material 440 may be removed by, e.g., a dry etching process, such as RIE.

At operation 325, the temporary MC pattern is transferred into the core material to form a final MC having the defined MC tip. In particular, using MC RIE, the temporary MC pattern formed by the remaining area of Cr hard mask layer 405 (temporarily defining the MC with an ultra-sharp tip) can be transferred into the $Ta_2O_5$ core material layer 415. As illustrated in the respective cross-sectional and top view of FIGS. 9A and 9B, MC RIE can be utilized to etch away the unwanted portions of the $SiO_2$ buffer layer and the $Ta_2O_5$ core material layer 415 (i.e., the portions not covered/protected by the remaining area of the Cr hard mask layer 405 temporarily defining the final MC.

At operation 330, the hard mask layer and the buffer layer are removed. As illustrated in the respective cross-sectional and top view of FIGS. 10A and 10B, the temporary MC pattern formed in Cr hard mask layer 405 and the AlOx MC RIE stop layer 420 are removed.

Figure 11A:
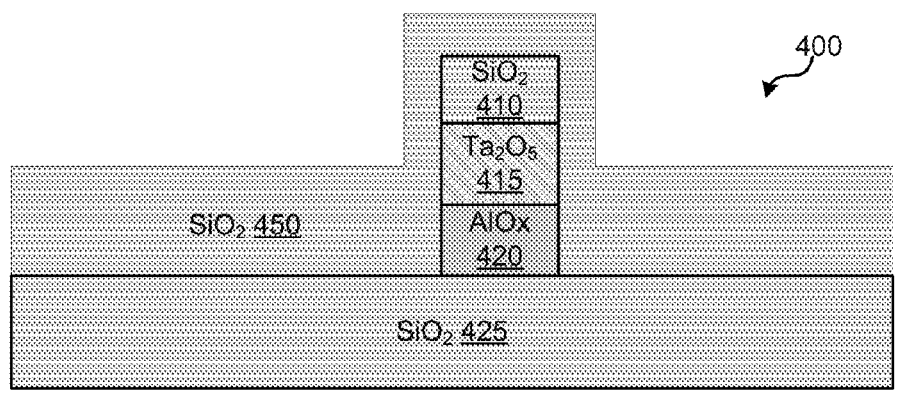
FIGS. 11A and 11B are respective cross-sectional and top views of the wafer film stack of FIGS. 4A and 4B where the hard mask and stop layers have been removed and a protective layer has been deposited subsequent to formation of the mode converter.
Figure 11B:
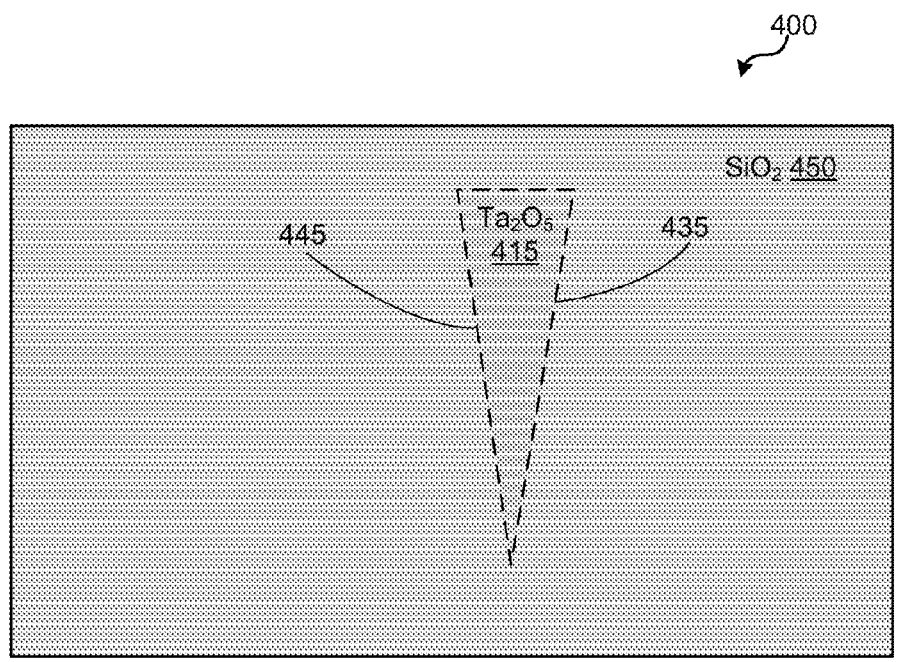

At operation 335, a protective layer is deposited over the final MC. That is, a $SiO_2$ layer can be deposited on the final MC to protect the final mode converter. This protective $SiO_2$ layer also acts as a second cladding layer for the $Ta_2O_5$ core material layer 415. As would be understood by those of ordinary skill in the art, cladding may be used to surround a waveguide core to reflect light back to the waveguide core and prevent light from escaping. The respective cross-sectional and top view of FIGS. 11A and 11B illustrate the final MC having an ultra-sharp tip and a protective/cladding layer of $SiO_2$.

Figure 12:
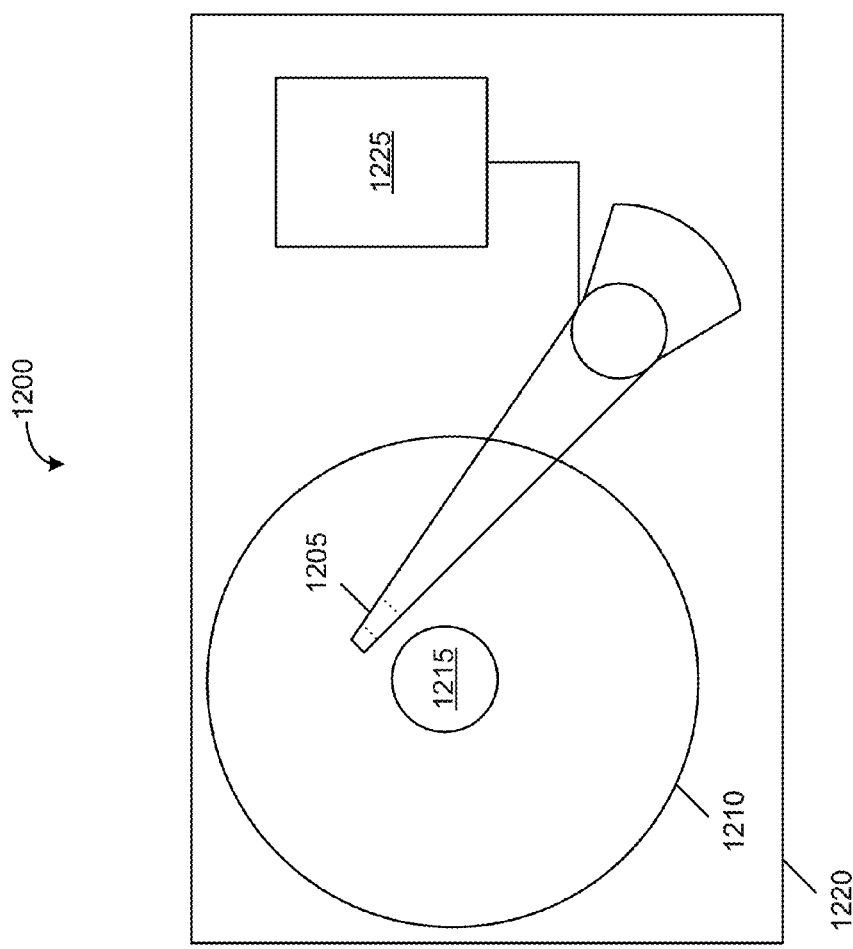
FIG. 12 is an example disk drive including a read/write head that can be created in accordance with various embodiments.

Various embodiments provide an MC having an ultra-sharp tip for use in a HAMR head. Such an MC allows the HAMR head to efficiently couple light (from an external light source such as an external laser diode) into a TWG, such as an interferometric TWG. It should be noted that although various embodiments have been described in the context of an MC for use in a HAMR head, the MC having an ultra-sharp tip and/or the processes for creating the MC having an ultra-sharp tip are contemplated for use in the context of other structures/purposes, e.g., a probing tip FIG. 12 is a diagram illustrating an example disk drive 1200 including a read-write the head 1205 that can be created in accordance with some embodiments. Disk drive 1200 may include one or more disks 1210 to store data. The disks 1210 reside on a spindle assembly 1215 that is mounted to drive housing 1220. Data may be stored along tracks in the magnetic recording layer of one of the disks 1210. The reading and writing of data is accomplished with the head 1205 that has both read and write elements. The write element is used to alter the properties of the perpendicular magnetic recording layer of disk 1210. In some embodiments, the head 1205 may comprising a magnetic recording pole fabricated according to an embodiment described herein. Additionally, for some embodiments, the head 1205 may be a HAMR head. In various embodiments, the disk drive 1200 may be a PMR drive, and the head 1205 may be suitable for PMR. A spindle motor (not shown) rotates the spindle assembly 1215 and, thereby, disks 1210 to position the head 1205 at a particular location along a desired disk track. The position of the head 1205 relative to the disks 1210 may be controlled by position control circuitry 1225.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of manufacturing a mode converter comprising:
   forming a mode converter process film stack comprising a stop layer, a core material, a buffer layer, a first cladding layer, and a hard mask layer;
   defining a first edge of the mode converter;
   transferring the first edge into the hard mask layer;
   defining a second edge of the mode converter, wherein respective ends of the first and second edges define a mode converter tip;
   transferring the second edge into the hard mask layer;
   forming a temporary mode converter pattern on the hard mask layer;
   temporarily transferring the mode converter pattern into the core material to form a final mode converter including the mode converter tip;
   removing the hard mask layer and the buffer layer; and
   depositing a second cladding layer over the final mode converter including the mode converter tip.

2. The method of claim 1, wherein the mode converter tip is defined by the first and second edges and has a width less than 200 nm.

3. The method of claim 1, wherein the mode converter tip is defined by the first and second edge and has a width ranging from approximately 200 nm to approximately 300 nm.

4. The method of claim 1, wherein the stop layer comprises an Aluminum Oxide (AlOx) reactive ion etch stop layer approximately 2-3 nm thick.

5. The method of claim 1, wherein the core material comprises Tantalum Pentoxide ($Ta_2O_5$).

6. The method of claim 1, wherein the buffer layer comprises Silicon Dioxide ($SiO_2$).

7. The method of claim 1, wherein the hard mask layer comprises one of Chromium (Cr), Ruthenium, or other metallic material.

8. The method of claim 1, wherein the hard mask layer is deposited on the buffer layer using a bi-layer lift-off process to produce an open metal seed window.

9. The method of claim 1, wherein the defining of the first edge comprises defining via a first deep ultraviolet scanner photolithography process.

10. The method of claim 9, wherein the transferring of the first edge comprises transferring via a first hard mask reactive ion etch process.

11. The method of claim 10, wherein the defining of the second edge comprises defining via a second deep ultraviolet scanner photolithography process.

12. The method of claim 11, wherein the transferring of the second edge comprises transferring via a second hard mask reactive ion etch process.

13. The method of claim 11, further comprising defining positions of the first and second edges to define the mode converter tip by measuring a position of the second edge relative to the first edge, the first edge acting as a reference layer.

14. The method of claim 1, wherein the second cladding layer comprises $SiO_2$.

15. A method of manufacturing a mode converter comprising:
   defining first and second edges of the mode converter using a sequential dual photolithography process;
   transferring the defined first and second edges into a hard mask layer of a mode converter process film stack to form a mode converter tip pattern;
   transferring the mode converter tip pattern onto a core material of the mode converter process film stack to form the mode converter;
   removing the hard mask layer; and
   depositing a protective layer on the mode converter.

* * * * *